July 15, 1969     TOMICHI KIKUMOTO     3,455,577

BANKING SYSTEM

Filed April 4, 1967     2 Sheets-Sheet 1

INVENTOR.
TOMICHI KIKUMOTO

BY *Steinberg + Blake*

ATTORNEYS

July 15, 1969   TOMICHI KIKUMOTO   3,455,577
BANKING SYSTEM

Filed April 4, 1967   2 Sheets-Sheet 2

INVENTOR.
TOMICHI KIKUMOTO
BY Steinberg & Blake
ATTORNEYS

United States Patent Office 3,455,577
Patented July 15, 1969

3,455,577
BANKING SYSTEM
Tomichi Kikumoto, Kashiwa-shi, Japan, assignor, by mesne assignments, to Eizo Komiyama, Ichikawa-shi, Chiba-ken, Japan
Filed Apr. 4, 1967, Ser. No. 628,481
Claims priority, application Japan, Sept. 5, 1966, 41/58,196
Int. Cl. B42d 15/00; G01n 21/30; G09f 3/02
U.S. Cl. 283—57                                     8 Claims

ABSTRACT OF THE DISCLOSURE

A banking system which does not require a passbook. The client carries an identification card on which is situated identifying indicia visible only when exposed to light which is beyond the visible spectrum. A means is provided for issuing such light to render the identifying indicia visible when the client presents the identification card at the bank together with a form which has been filled out with the information pertaining to a deposit or withdrawal and on which the client has placed the identifying indicia. In this way the identifying indicia on the form can be compared with that on the card, and then suitable entries can be made in a computer so that the new balance will be recorded and maintained in the records of the bank.

BACKGROUND OF THE INVENTION

In conventional systems for banks or the like, a client has possession of a passbook in which is kept a record of deposits, withdrawals, and the balance. This passbook may also have certain identifying indicia which will identify the client such as the signature of the client, a seal, an account number, and the like.

When utilizing a passbook of this type it is necessary for the bank to carry out relatively complicated procedures requiring a considerable amount of time for introducing suitable entries not only in the passbook but also in the records of the bank, and in addition, particularly when withdrawals are made, it is necessary to compare the identifying indicia presented by the client with that which is on hand at the bank. As a result a considerable amount of time is required for transacting business with each client, and as a result it is not uncomon to find, particularly on certain days, long lines at a bank where clients wait for their turn at the window.

To some extent the above drawbacks have been avoided by introducing computerized control systems having, for example, suitable tapes on which the records of the bank are recorded so that in this case the old-fashioned deposit ledgers and the like are no longer required and the operations are simplified and speeded to some extent. However, even with such a computerized control system it is necessary for the client to have a passbook and the operations which are carried out by the client remain the same, so that substantial periods are still essential for carrrying out the necessary transactions. It is still necessary, for example for the identifying indicia, such as the signature of the client, to be compared with a signature on hand at the bank to enable proper identification to be made before money can be paid out. In this way unauthorized payment of money can be avoided.

SUMMARY OF THE INVENTION

It is a primary object of the present invention to provide a banking system of the above general type which will further simplify and speed up the operations required to be carried out at the bank, so that in this way the time required for the transactions of each client can be further reduced and thus the time required for clients to wait their turn at a bank can be considerably diminished.

In particular, it is an object of the invention to provide a banking system which no longer requires each client to carry a passbook but instead simply requires each client to carry an identification card which need only be presented to the bank with a suitably filled out form in order to carry out the necessary transactions.

In addition, it is an object of the invention to utilize in a system of this type an identification card which greatly reduces the possibility of unauthorized use thereof if it should become lost or stolen and which at the same time makes it possible to provide a rapid, accurate identification of the client when the card is presented at the bank.

Thus, it is an object of the invention not only to provide a system in which the time required for various transactions can be reduced but also to provide a system in which the reliability of the transactions are enhanced in that the possibility of carrying out transactions with unauthorized individuals can be very greatly diminished.

Thus, in accordance with the invention there will be at a bank or the like a computer means for receiving entries and withdrawals and for recording the balance of a given client. An identification card is carried by the client, and this identification card has thereon identifying indicia which identifies the client. A cover means is carried by the card in a position covering the indicia for rendering the latter visible only when exposed to light which is beyond the visible spectrum, and there is at the bank a means for directing light beyond the visible spectrum to the cover means so as to render the identifying indicia on the card visible at the bank. Together with this card the client will present a form suitably filled out with information as to deposits and withdrawals and on which the client has placed identifying indicia which is compared with that which appears when the cover means is exposed to the light beyond the visible spectrum, so that in this way a suitable identification can be made before further transactions are carried out. Then the entries are introduced into the computer means which will automatically carry out the required calculations changing the previous balance to the new balance, and in this way the transaction is very rapidly carried out so that the time required for each client is greatly diminished. The client no longer is required to have a passbook but simply has an identification card, and all of the records with respect to the balance of a given client which is on hand at the bank are kept by the bank. With this system if it should happen that the identification card of a given client becomes lost or stolen, there is very little possibility that this card will be used in an unauthorized manner because the identifying indicia thereon is not visible in the visible spectrum.

BRIEF DESCRIPTION OF THE DRAWINGS

The invention is illutrated by way of example in the accompanying drawings which form part of this application and in which.

DESCRIPTION OF PREFERRED EMBODIMENTS

Figure 1:
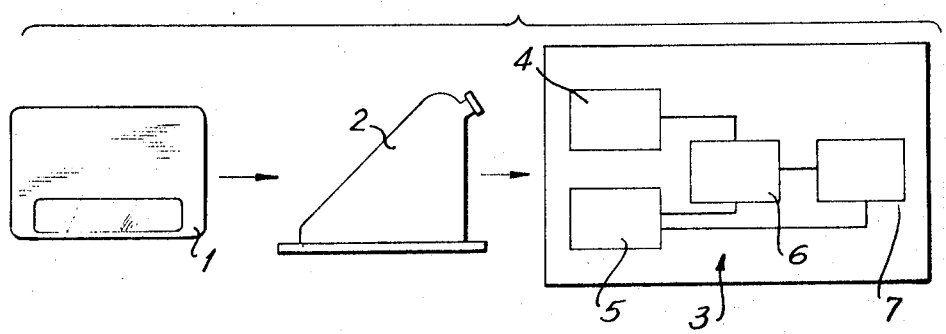
FIG. 1 is a schematic representation of the components used in the system of the invention.

Referring to FIG. 1, there is shown therein an identification card 1 and a comparison device 2 used for comparing identification indicia on the card 1 with identification indicia which has been placed by a client on a form on which is also placed entries with respect to withdrawals and deposits, for example. The details of the card 1 and and the device 2 are described below and shown in the further figures of the drawings. FIG. 1 also shows a computer means 3 which, as is schematically indicated in FIG. 1, includes an input section 4 for receiving information such as the amounts of a withdrawal or deposit, a recording section 5 in which a balance of a given client is recorded, a calculating section 6 in which the new balance is calculated to again be recorded by the recorder section 5, and an output section 7 where the results of the calculations made at the section 6 are indicated before being fed back to the recording section 5, this output section 7 indicating the new balance in accordance with the withdrawals or deposits which are carried out during the transaction.

Figure 2:
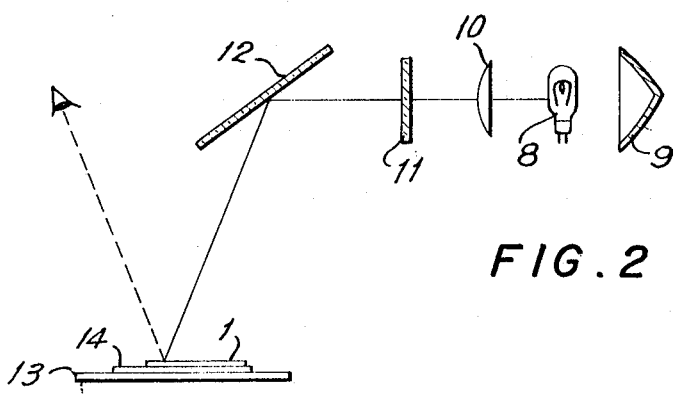
FIG. 2 is a schematic illustration of structure for directing ultraviolet light onto an identification car situated over a form which is on a suitable support.

FIG. 2 shows schematically the details of one possible embodiment of a device 2 for comparing identifying indicia on the card 1 with identifying indicia on a form 14 which carries the information with respect to the transaction and on which the client places the identifying indicia when at the bank. This device which is shown in FIG. 2 includes an ultraviolet lamp 8, forming a source of ultraviolet light, and situated in front of a reflector 9 which directs the light through a condensing lens 10 and an ultraviolet filter 11 to a reflector 12. From the reflector 12 the ultraviolet light is directed onto the identification card 1 to pass through a cover means thereof which includes an ultraviolet filter, so that identifying indicia beneath this cover means on the card 1 will be rendered visible. The card 1 is placed in a position overlapping a form 14 which is situated on a suitable support 13, and in its position of FIG. 2 the card 1 leaves exposed on the form 14 the identifying indicia such as a signature of the client which is placed on the form 14 when the client is at the bank. This latter identifying indicia will be compared with that which is render visible by the ultraviolet light, and once proper identification has been made the teller or the like at the bank will operate the computer means 3 to carry out the required transaction.

Figure 6:
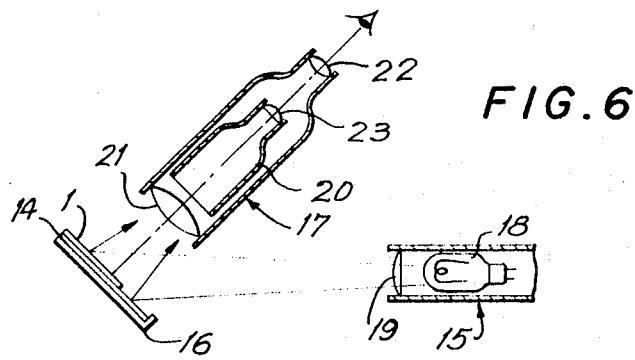
FIG. 6 schematically illustrates a structure for directing infrared light onto an identification card situated on a form which is on a suitable support, FIG. 6 also schematically showing a device for viewing the card onto which the infrared light is directed.

Referring to FIG. 6, the device 2 of this embodiment utilizes infrared rays to render the identification indicia on the card 1 invisible. For this purpose the card 1 is placed on the form 14 which in turn is situated on a suitable support 16 located in the path of infrared light issuing from an infrared lamp 18. The means 15 for directing the infrared light to the card 1 includes, in addition to the lamp 18 which is situated in a suitable housing, a condensing lens 19 through which the light is directed to the support 16.

Positioned to receive reflected infrared light is a viewing means 17 which has at its lower end an objective 21 through which the reflected light passes and at its upper end an ocular 22. Situated within the housing of the viewing means 17 is an imaging tube 20 which carries at its upper end a screen 23 on which the operator will see an image reflected from the card 1 and the form 14 when the operator looks through the ocular 22 into the viewing means 17. The identification card 1 which is used with the device of FIG. 6 carries a cover means which renders the identifying indicia on the card 1 visible only when exposed to infrared light.

Figure 3:
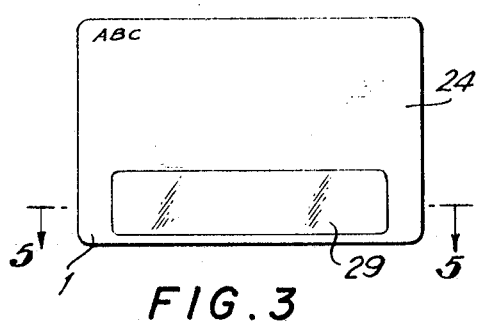
FIG. 3 is a front elevation of the identification card.
Figure 4:
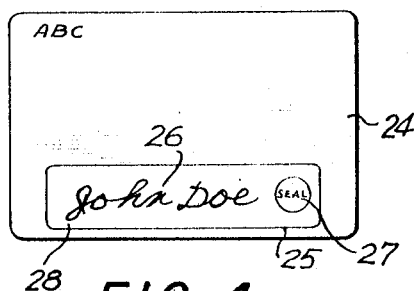
FIG. 4 is a front elevation of the identification card with the cover means thereof removed so as to show the identifying indicia thereon.
Figure 5:
FIG. 5 is a longitudinal section of the card of FIG. 3 taken along line 5—5 of FIG. 3 in the direction of the arrows.
Figure 7:
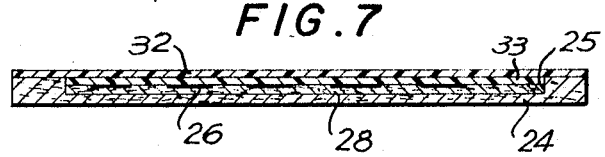
FIG. 7 is a longitudinal sectional view taken in a plane similar to the section of FIG. 5 but showing details of a different embodiment of an identification card.

The identification card 1 includes a card body 24 which is formed with a recess 25 in its upper face, as shown in FIGS. 5 and 7, and in the interior of the recess 25, next to the bottom surface of this recess, there is situated in both of the embodiments of FIGS. 5 and 7 a sheet 28 on which the identifying indicia 26, 27 it situated. This indicia may include a signature 26 of the client as well as a seal 27, if desired, the cover means 29 which is indicated in FIG. 3 is located over the sheet 28 to prevent the indicia 26, 27 from being visible except when the cover means 29 is exposed to light beyond the visible spectrum. In this particular embodiment, the details of which are shown in FIG. 5, the upper surface of the sheet 28 has a coating of a fluorescent material while the identifying indicia 26, 27 are made of an ink, for example, of a preselected color which is non-fluorescent, this ink reflecting and/or absorbing ultraviolet light. As may be seen from FIG. 5 there is situated over the fluorescent surface of the sheet 28 a translucent film 31 formed by vapor-deposition of a metal such as silver, aluminum, chrome, or the like on a colored filter 30 which is of the same color as the indicia 26, 27 and which is an ultraviolet filter permeable to the ultraviolet light so that the latter can pass through the filter 30 and the translucent film 31 to reach the fluorescent surface of the sheet 28. Situated over the entire upper surface of the card body 24, including the recess 25 thereof, is a protective transparent film 32 which is applied to the upper surface of the card body 24 over the entire area thereof in any suitable way, and in this way the filter 30 in particular is retained in a protective manner in the recess 25 with the vapor-deposited translucent film 31 situated between the filter 30 and the fluorescent surface of the sheet 28 on which the identifying indicia 26, 27 is located.

In the embodiment of FIG. 7, on the other hand, the card body 24 has situated in the recess 25 the sheet 28 which has thereon the indicia 26, 27 but in this case this latter indicia may be made of an ink such as India ink which will absorb infrared light. In this case the upper surface of the sheet 28 need not be fluorescent and is only required to have light-reflecting properties, so that the sheet 28 may simply be made white, for example, for this purpose. With this embodiment there is situated in the recess 25 over the sheet 28 an infrared filter 33 which permits infrared rays to pass through to the upper exposed surface of the sheet 28 but which renders the identifying indicia 26, 27 invisible in the visible spectrum. Of course, in the embodiment of FIG. 5, the ultraviolet filter 30 will render the identifying indicia invisible in the visible spectrum. It will be noted that in the embodiment of FIG. 7 there is also a transparent protective film 32 located over the entire upper face of the card body 24, covering also the recess 25 thereof and the infrared filter 33 so as to protect the latter.

Figure 8:
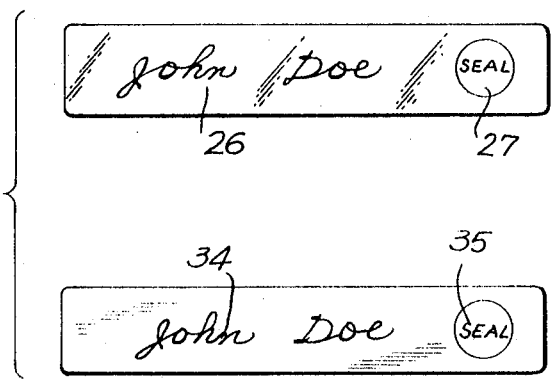
FIG. 8 illustrates how a comparison is made of identifying indicia on the identification card and on a form which is filled out by the client.

When the card of FIG. 5 is used with the device of FIG. 2, or when the card of FIG. 7 is used with the device of FIG. 6, the operator will see not only the indicia 26, 27 as indicated in FIG. 8 but also the indicia 34, 35 which has been placed by the client on the form 14 and which is situated beyond the card 1 on the support 13 in the case of FIG. 2 and on the support 16 in the case of FIG. 6. In this way it is possible for a comparison to be rapidly and accurately carried out, so as to ascertain the proper identity of the bearer of the card 1. Thus, with the system of the invention the client carries only the identification card 1. The device 2 is situated at the window of the bank where the computer means 3 is also situated. The client will present at the window the identification card 1 together with the form 14 which has been filled out with the information pertaining to the desired transaction as well as with the identifying indicia 34, 35 made by hand at the bank before or when the form 14 is presented at the window together with the identification card. The bank teller at the window will thus receive the form 14 and the identification card 1 and will place them either on the support 13 of the device of FIG. 2 or on the support 16 of the device of FIG. 6, and then the device 2 will be operated so that the teller will be able to compare the identification indicia 26, 27 with the indicia 34, 35 when these two sets of indicia are rendered visible to the teller in the manner illustrated in FIG. 8. Once the teller is satisfied that a properly authorized individual has presented the identification card and form 14, the teller will operate the computer means 3 so as to carry out and record the transaction.

In the case where the device of FIG. 2 is used with the card of FIG. 5, the card is placed on the form 14 which has previously been placed on the support 13 of FIG. 2. The position of the card 1 on the form 14 in the device of FIG. 2 is such that the indicia 34, 35 on the form 14 is exposed beneath the card 1 and is readily visible. The lamp 8 is energized so that the cover means 29 of the embodiment of FIG. 5 is exposed to ultraviolet rays. The ultraviolet light will penetrate through the transparent film 32 and through the colored ultraviolet filter 30 and the translucent film 31 so as to reach the fluorescent surface of the sheet 28. As a result this surface emits fluorescence which is readily noticed by the operator, except for the non-fluorescent outline provided by the identifying indicia 26, 27. Because this latter indicia is made of an ink, for example, which is non-fluorescent and reflects and/or absorbs ultravolet light, the identifying indicia will appear dark in the fluorescent field and by sharply contrasting therewith will be readily visible so as to be rendered available for comparison with the indicia 34, 35 on the form 14.

In the case of FIG. 6, the card 1 is placed on the form 14 in the same way as in the case of FIG. 2, although the form 14 is in this case placed on the support 16. Now the lamp 18 will be energized so that infrared rays will be received by the paper 28 after passing through the infrared filter 33 and of course through the transparent protective film 32. The sheet 28 will reflect the infrared rays into the imaging tube 20 after first reflecting the light through the objective 21. However, the infrared rays are absorbed by the indicia 26, 27 of this embodiment. Therefore, the outline of the indicia 26, 27 appears as a dark outline in contrast with the reflected light at the screen 23 where an image of the identifying indicia 26, 27 is provided. At the same time, the indicia 34, 35 can be made of an ink which absorbs infrared rays, so that this latter indicia will also appear as a dark outline on the image screen 23, while the light reflected from the form 14 will also extend into the viewing means 17, and thus the operator can make a ready comparison of the sets of indicia which appear as shown in FIG. 8.

Thus, it is apparent that with the system of the invention the identification card has the identifying indicia thereon covered by a cover means which will render the indicia visible only when exposed to light beyond the visible spectrum. The identification of the card owner can thus be very readily and accurately carried out while providing the safety of preventing unauthorized use of the card if it is lost or stolen. Once the identification has been made it is a simple matter to quickly operate the computer means 3 so as to carry out the required transaction. Thus, with the system and structure of the invention there is a considerable time saving both for client as well as for personnel at the bank or the like, so that not only are there savings of costs by the financial institution but also a considerable improvement in the convenience for the clients. It should be noted that not the least of the advantages derived from the invention resides in the fact that each teller can handle more clients than would otherwise be possible. Thus, with the invention there is an improved operating efficiency, and an improved safety with respect to the identification cards which cannot be used in an unauthorized manner.

While the invention has been described above in connection with bank transactions, the system of the invention can also be used with retail establishments using so-called credit card systems, and of course establishments such as department stores will have charge accounts where computers can be used in the manner described above in connection with a bank.

What is claimed is:

1. In a banking system or the like, requiring no passbook, computer means for receiving deposit and withdrawal entries and for recording the resulting balance of a given client, an identification card carried by the client and having thereon identifying indicia which identifies the client, cover means carried by the card in a position covering the identifying indicia thereon for rendering the latter visible only when exposed to light situated beyond the visible spectrum, so that in the visible spectrum the identifying indicia on the identification card is invisible, and means for exposing said cover means to said light beyond the visible spectrum for rendering said identifying indicia visible when the card is presented at a bank or the like together with a form for making a deposit or withdrawal and on which the identifying indicia is placed by the client at the bank, so that when the identifying indicia is seen and compared with that of the form, entries can be made in said computer means and transactions such as deposits and withdrawals can be carried out without requiring the use of a passbook.

2. The combination of claim 1 and wherein said cover means renders said identifying indicia visible only when exposed to ultraviolet light, said means for providing said light beyond the visible spectrum directing ultraviolet light to said cover means.

3. The combination of claim 1 and wherein said cover means renders said identifying indicia visible only when exposed to infrared light, and said means for providing said light beyond the visible spectrum directing infrared light to said cover means.

4. The combination of claim 1 and wherein said card has an upper face formed with a recess, a sheet which carries said identifying indicia being located in said recess, and said cover means being situated over said sheet also in said recess.

5. The combination of claim 4 and wherein a transparent protective film covers said upper face of said card and said recess, extending over said cover means therein.

6. The combination of claim 4 and wherein said sheet has an upper exposed fluorescent surface, said identifying indicia being made of a material of a predetermined color which is non-fluorescent, and said cover means including a translucent film and an ultraviolet filter of the same color as that of said indicia so that when ultraviolet light is directed through said cover means said upper surface of said sheet will emit fluorescence while said indicia will remain dark to contrast with the emitted fluorescence and thus be rendered visible.

7. The combination of claim 4 and wherein said indicia on said sheet is made of a material which absorbs infrared rays, said cover means including an infrared filter located over said sheet so that when infrared light is directed through said filter it will be reflected by said sheet but not by said indicia, so that the latter will be rendered visible when viewed through a suitable viewing device which receives the reflected infrared rays.

8. A method for carrying out banking transactions or the like without a passbook, comprising the steps of exposing to light which is beyond the visible spectrum an identification card having thereon identification indicia which is visible only when exposed to the light which is beyond the visible spectrum, comparing the identifying indicia which is thus rendered visible with identifying indicia on a form which has also information with respect to the transaction which is to be carried out, and then making transaction entries in a computer which records the transaction, so that a passbook is not required.

References Cited

UNITED STATES PATENTS

| | | | |
|---|---|---|---|
| 2,397,272 | 3/1946 | Land. | |
| 2,654,971 | 10/1953 | Harrison | 40—134 |
| 3,245,697 | 4/1966 | Nugent | 40—2.2 X |
| 3,279,826 | 10/1966 | Rudershausen | 283—7 |

EUGENE R. CAPOZIO, Primary Examiner

W. J. CONTRERAS, Assistant Examiner

U.S. Cl. X.R.

8—108, 109; 40—2.2; 162—88, 87; 250—219; 283—6